United States Patent [19]

de Geeter

[11] Patent Number: 5,443,329
[45] Date of Patent: Aug. 22, 1995

[54] STABILIZATION MEANS

[75] Inventor: Pieter J. de Geeter, Western Australia, Australia

[73] Assignees: Spuncon Pty. Ltd.; Marecon Pty. Ltd., both of Western Australia, Australia

[21] Appl. No.: 345,009

[22] Filed: Nov. 23, 1994

Related U.S. Application Data

[63] Continuation of Ser. No. 583,727, Sep. 14, 1990, abandoned.

[30] Foreign Application Priority Data

Feb. 23, 1990 [AU] Australia .................. PJ8797

[51] Int. Cl.6 .................................................. F16L 1/00
[52] U.S. Cl. ............................................ 495/172; 405/154
[58] Field of Search ................ 405/154, 157, 172, 17

[56] References Cited

U.S. PATENT DOCUMENTS

| 4,171,174 | 10/1979 | Larsen | 405/157 X |
| 4,242,010 | 12/1980 | Gjerde et al. | 405/157 |

FOREIGN PATENT DOCUMENTS

| 450169 | 3/1974 | Australia . | |
| 462867 | 3/1975 | Australia . | |
| 0152232 | 8/1985 | European Pat. Off. . | |
| 7808704 | 2/1979 | Netherlands | 405/157 |
| 7804372 | 10/1979 | Netherlands | 405/157 |
| 8206-467A | 6/1984 | Sweden . | |
| 1418759 | 12/1975 | United Kingdom . | |
| 1435123 | 5/1976 | United Kingdom . | |
| 1523367 | 8/1978 | United Kingdom . | |
| 2035504 | 6/1980 | United Kingdom | 405/157 |
| 2178127A | 2/1987 | United Kingdom . | |
| 2230318A | 10/1990 | United Kingdom . | |
| 594390 | 2/1978 | U.S.S.R. . | |
| 690230 | 10/1979 | U.S.S.R. . | |
| 983194 | 12/1982 | U.S.S.R. | 405/157 |

*Primary Examiner*—Dennis L. Taylor
*Assistant Examiner*—Howard N. Shipley
*Attorney, Agent, or Firm*—Ralph F. Crandell; Holland & Hart

[57] ABSTRACT

An apparatus for stabilizing an underwater object such as a pipeline includes at least one pair of weights supported on a blanket with the blanket adapted to be disposed across and in engaging contact with the top of the underwater object so that the weights are disposed on opposite sides of the object and a flexible connector between the two weights so as to allow the weights to apply compressive forces to opposite sides of the underwater object to assist in retaining the weights in position relative to the object. A method is also disclosed for laying the underwater object by clampingly placing the afore-described apparatus on the pipeline as it is lowered into the water.

15 Claims, 6 Drawing Sheets

STABILIZATION MEANS

CROSS-REFERENCE TO RELATED APPLICATION

This application is a continuation of U.S. application Ser. No. 07/583,727, filed Sep. 14, 1990, now abandoned.

BACKGROUND OF THE INVENTION

This invention relates to a means for providing gravity stabilization of an object such as an underwater pipeline, and to a method of installing such means.

It is usually necessary to stabilize an underwater pipeline both during installation of the pipeline and once the pipeline is in position on the floor of the body of water. During installation of the pipeline, the gravity stabilization is required to overcome any buoyancy effects of the pipeline. Once the pipeline is in position, gravity stabilization is required to prevent the pipeline from shifting under the effects of wave motion and water currents.

In some situations gravity stabilization is achieved by providing a coating of concrete on the pipeline so as to increase its weight; this procedure is known as weight-coating. It is not altogether satisfactory as some of the increased weight of the pipeline is utilized in offsetting the buoyancy effect of the increase in diameter of the pipeline.

In other situations, gravity stabilization is achieved by use of a massive mat structure comprising concrete elements flexibly linked together to allow the mat structure to be draped over the pipeline with the outer edges of the mat structure resting on the floor of the body of water. While such mat structures perform satisfactorily once in position on a pipeline, they are designed to be installed on a section of the pipeline only after the pipeline section has been laid and so they do not satisfy the need for stabilization of the pipeline section during laying. Furthermore the pipeline remains in a vulnerable state on the floor of the body of water until the mat structures have been laid. This can be a problem particularly if the site has to be evacuated owing to adverse weather conditions before all of the mat structures have been installed. Additionally, installation of the mat structures presents some difficulty as they have to be supported in a deployment frame while they are lowered into position above the appropriate section of the pipeline and then carefully located in position.

It is also known to provide a ballast weight assembly for a pipeline laid on marshy ground or underwater. The ballast weight assembly is adapted to clampingly engage the pipeline and comprises a pair of clamps pivotally connected together at their upper ends by a massive saddle comprising two sections which are pivotally interconnected. The lower or free ends of the clamps are interconnected by a flexible band. The ballast weight assembly is installed onto a pipeline using a detachable support beam to lower it onto the pipeline with the clamps located one on each side of the pipeline. As the ballast weight assembly is lowered onto the pipeline, the flexible band deflects as it comes into contact with the upper section of the pipeline and so causes the clamps to pivot inwardly and clampingly engage the pipeline to secure the assembly in position. Because of the massive nature of the saddle, the ballast weight assembly would appear to provide the desired anchoring function.

There are, however, several deficiencies which appear to exist with the ballast weight assembly. One such deficiency is that the clamping action on the pipeline is very much reliant on vertical loadings applied to the clamps by the massive saddle. It therefore follows that the saddle should not rest on the pipeline for otherwise the vertical loadings on the clamps would be reduced with the result that the clamping action on the pipeline would diminish. A further deficiency is that massive saddle produces a high center of gravity in the ballast weight assembly with the result that the center of gravity is above the center of the pipeline when the assembly is in position. This is detrimental to the rotational stability of the ballast weight assembly when on the pipeline and means that it is most unlikely that the ballast weight assembly could be installed on a pipeline being lowered onto the seabed under normal operational conditions at sea. The rotational instability created by the ballast weight assembly may also crease problems for a pipeline installed underwater owing to wave and current action. A still further deficiency arising from the massive saddle is the large profile that the ballast weight assembly presents when in position on a pipeline. As a result of the large profile, there is a substantial surface area of the ballast weight assembly exposed to the influences of underwater currents and other water motion. The forces which are imparted to the ballast weight assembly as a result of the influences of such water motion can cause the assembly to dislodge from the pipeline or the pipeline to shift laterally underwater.

From the foregoing discussion it is evident that the means for gravity stabilization which have been described have not performed altogether satisfactorily in the situations outlined.

The present invention seeks to provide a novel and useful means for gravity stabilization which when applied to stabilization of underwater pipelines can be utilized to provide gravity stabilization both during laying of the pipeline and once the pipeline is in position on the floor of the body of water.

SUMMARY OF THE INVENTION

In one form the invention resides in stabilization means for providing gravity stabilization of an object comprising a pair of weights and linking means interconnecting said weights for swinging movement towards and away from each other wherein said weights are adapted to be positioned on opposed sides of said object with said connection means resting on said object such that said weights are caused to swing into engagement with said object, said linking means comprising upper and lower connection means, said upper connection means interconnecting the upper end sections of said weights and said lower connection means interconnecting the lower end sections of said weights, said weights and said linking means being so shaped-and dimensioned that the center of gravity of said stabilization means is in use below the geometric center of said object.

With this arrangement,, said stabilization means can clampingly engage against the object by virtue of the friction which arises as a result of the compressive force which exists between said weights and the object when said weights are not resting on a support surface such as the floor of a body of water.

Said upper connection means may be of any suitable construction such as a cable or like flexible member, a rod or like element which is stiff yet capable of lateral deflection, or a rigid member onto which the weights are hingedly mounted. For preference, however, said upper connection means comprises a strap of flexible material which has the benefit that it can conform generally to the profile of the upper section of the object and so not present a substantial surface which would be exposed to external influences.

Preferably, said lower connection means is formed of a flexible material. For preference, said lower connection means comprises a sheet of such flexible material onto which said weights are mounted.

Preferably, said upper connection means is anchored to the top face of each weight.

Preferably, said lower connection means is anchored to the lower face of each weight.

Preferably, the arrangement between the upper connection means and the weights is such that the compressive force which exists between each weight and said object exceeds the weight of said weight.

In another form the invention resides in a means for stabilizing an elongated object comprising a flexible base, at least two weights mounted on the base and defining a locating space therebetween for receiving a portion of said elongated object with said base overlying said portion, and an upper connection means interconnecting the upper end sections of the weights, said flexible base and said upper connection means cooperating to permit movement of the weights towards and away from each other whereby said weights can engage against said elongated object.

Preferably, said upper connection means comprises a flexible strap the ends of which are connected to the top portions of said weights.

In still another form the invention resides in a method of installing means for stabilizing an elongated object as set forth hereinbefore, said method comprising the steps of locating said stabilizing means on a section of said elongated object prior to or at some stage during lowering of said section of said elongated object onto a support surface whereby said stabilizing means clampingly engages said section of said elongated object while being lowered onto said support surface.

In still another form the invention resides in a method of laying an elongated object such as a pipeline or cable in a body of water from a location at or near the surface of the body of water, said method comprising the steps of introducing the elongated object into the body of water and installing stabilization means as set forth hereinbefore on the elongated object at intervals along the length thereof as sections of the elongated object descend towards the floor of the body of water.

BRIEF DESCRIPTION OF THE DRAWINGS

The invention will be better understood by reference to the following description of one specific embodiment thereof as shown in the accompanying drawings in which.

DESCRIPTION OF PREFERRED EMBODIMENT

Figure 1:
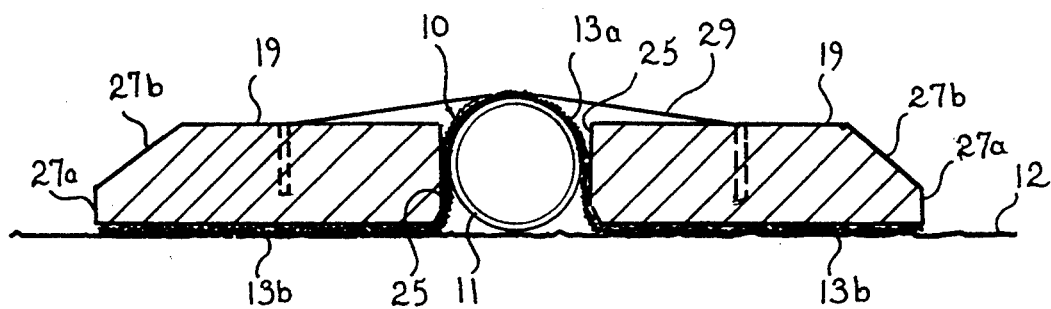
FIG. 1 is a schematic cross-sectional view of stabilization means according to the embodiment positioned on a pipeline resting on the seabed.
Figure 2:
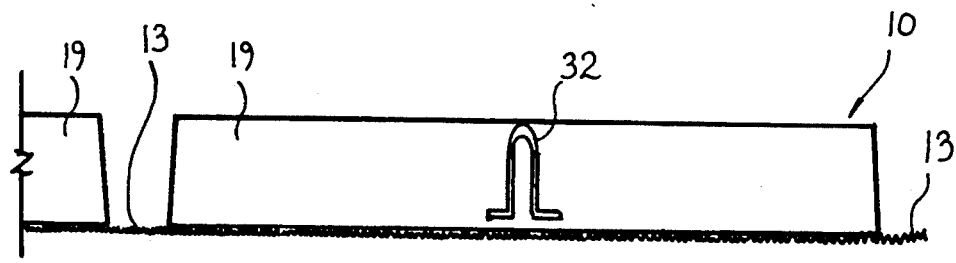
FIG. 2 is a side elevational view of the stabilization means of FIG. 1.
Figure 3:
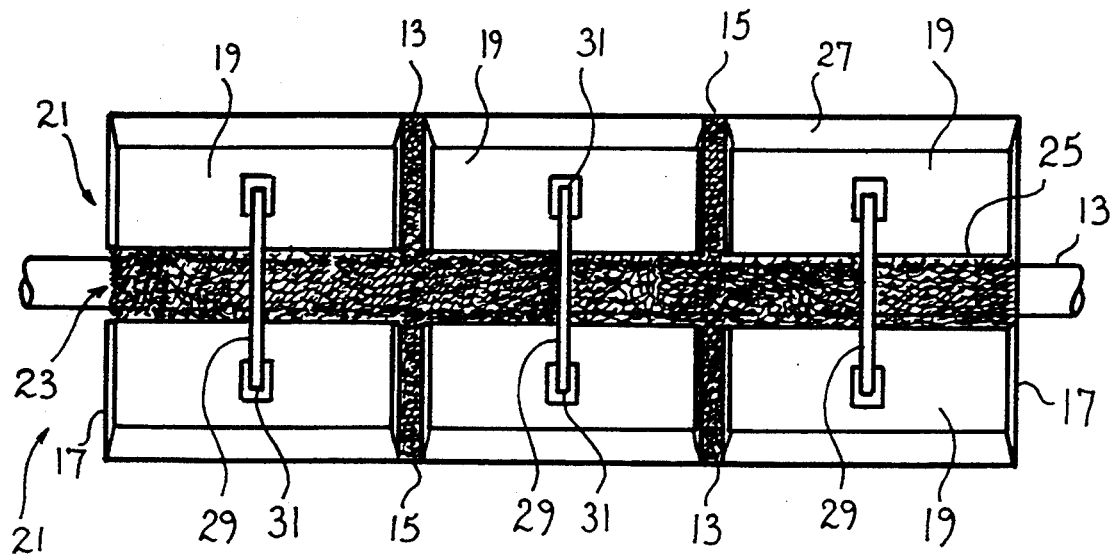
FIG. 3 is a plan view of the stabilization means of FIG. 1.

The embodiment shown in the drawings is directed to a means 10 for gravity stabilization of an underwater pipeline 11 both during installation of the pipeline and once the pipeline is resting on the seabed, The stabilization means 10 can be used to overcome any buoyancy effect on the pipeline and stabilize it against lateral movement when exposed to forces induced by water currents and wave action The stabilization means also serves to afford some protection against undermining of the pipeline by water currents as it rests on the seabed.

The stabilization means 10 is in the form of a mat structure which is draped over the pipeline. The mat structure 10 comprises a flexible base 13 and weights 19 mounted on the base 13. The base 13 is planar and of rectangular configuration, having a pair of longitudinal sides 15 and a pair of transverse sides 17. The base is pervious to water but impervious to fine sand and may be in the form of a sheet of robust woven mesh fabric formed from, for example, polypropylene or other high strength synthetic material which is resistant to degradation by water, sunlight and other harmful elements which may exist in the environment in which the stabilization means is used.

Weights 19 are mounted on one face of the flexible base 13. In this embodiment the weights 19 are in the form of concrete blocks and each block is secured to the flexible base by means of a plurality of pins (not shown) which extend through the base 13 and are embedded in the block 19. The pins are formed of material resistant to degradation and shock loadings. In another arrangement, the concrete blocks can be secured to the flexible base by way of loops which are woven into the base 13 and embedded into the concrete of the blocks 19.

The concrete blocks are arranged in confronting relationship in two rows 21, and a locating space 23 is defined between the two rows for receiving a section of the pipeline as will be explained later.

The concrete blocks are elongated, each having a longitudinal inner side face 25.

The inner side faces 25 of the concrete blocks are substantially normal to the plane of the flexible base when the latter is laid in flat condition. More particularly, the inner faces 25 are shaped to conform to the profile of the pipeline. This has the effect of reducing the extent to which each inner face is exposed to hydrodynamic forces.

Figure 4:
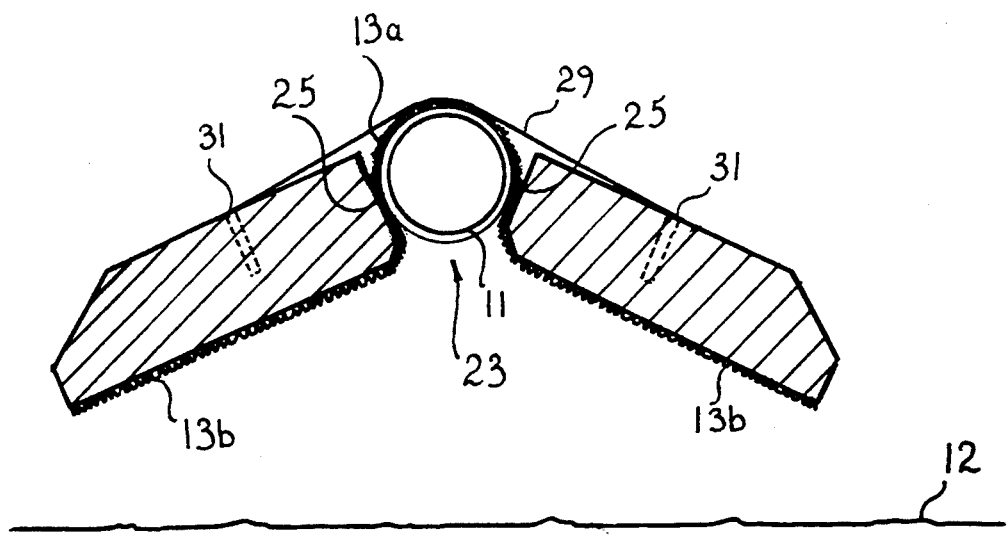
FIG. 4 is a schematic view showing the stabilization means clampingly engaging a section of the pipeline as it is lowered into position on the seabed.
Figure 5:
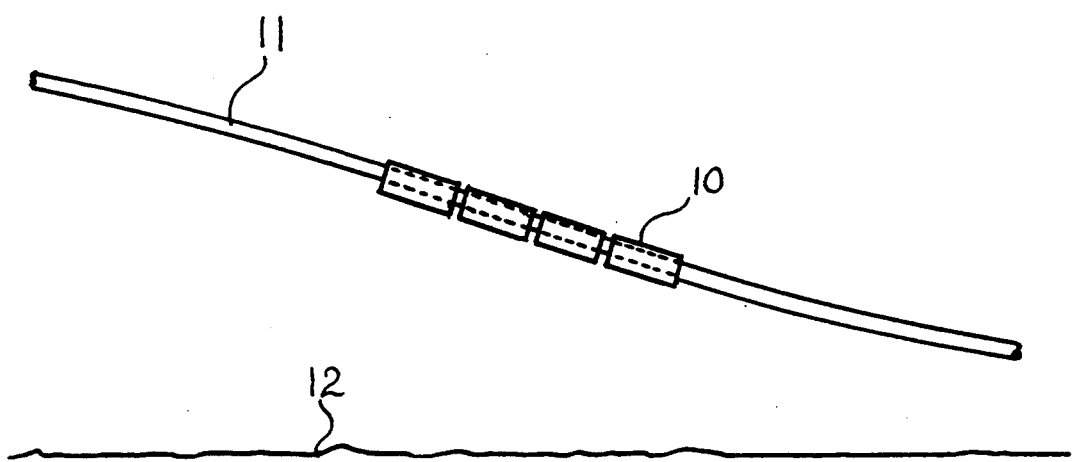
FIG. 5 is a schematic side elevational view showing the stabilization means located on the section of the pipeline being installed on the seabed.

The outer side face 27 of each block is configured for the purpose of offering lower resistance to oncoming water flow thereby reducing the effect of water motion on the stabilization means. This configuration of the blocks also serves to reduce the likelihood of the blocks being caught on obstacles at any stage such as during handling and installation or while in place underwater. In this embodiment, the outer face comprises two face sections, being a first face section 27a which is substantially normal to the plane of the base 13 and a second face section 27b which is inclined upwardly and inwardly, as best seen in FIGS. 1 and 4 of the drawings.

The spacing between the inner faces of confronting blocks is such that the width of the center section 13a of flexible base extending across the locating space 23 is sufficient to straddle the section of pipeline received in the locating space, as shown in FIG. 1.

Lifting lugs 32 or other attachment means are embedded in the blocks to facilitate lifting of the stabilization means for transportation and installation purposes.

The mattress structure is adapted to clampingly engage the pipeline 33 when draped over the pipeline during installation. For this purpose an upper connection means in the form of flexible strap 29 is provided between confronting concrete blocks in the two rows. The ends of each flexible strap 29 are fixed to the top faces of the respective concrete blocks by way of fixing means 31 such as pins 31 embedded in the block. The flexible strap 29 in combination with the flexible base 13 effectively provides a hinge between the two confronting blocks such that when the mat is draped over the pipeline 33 with a section of the pipeline received in the locating space 23, the confronting blocks are caused to swing inwardly with the result that the inner faces 25 clampingly engage the pipeline, as best shown in FIG. 4 of the drawings. For this purpose, the portion of the flexible strap 29 bridging the locating space 23 is shorter in length than the width of the section 13a of the flexible base extending across the locating space 23.

The flexible strap 29, center section 13a of the flexible base and the blocks 19 are suitably dimensioned and shaped such that the center of gravity of the mat structure is below the geometric center of the pipeline when installed in position.

The flexible strap 29 can be maintained permanently in place after installation of the pipeline on the seabed, retrieved for further use if so desired, or simply cut to allow the concrete blocks to further rotate downward to settle further into the seabed.

Figure 6:
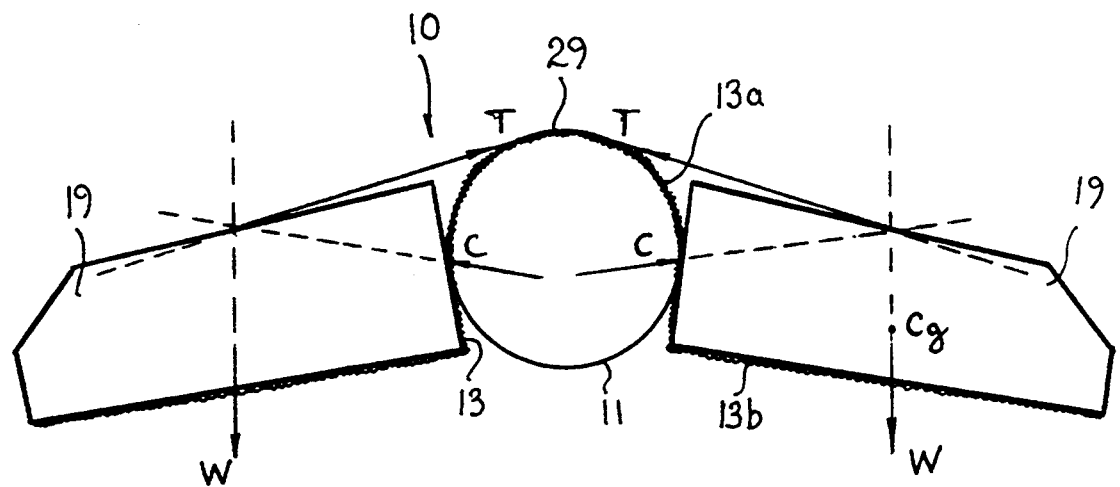
FIG. 6 is a schematic cross-sectional view illustrating certain forces which are established between the stabilization means and the section of the pipeline being installed on the seabed.
Figure 7:
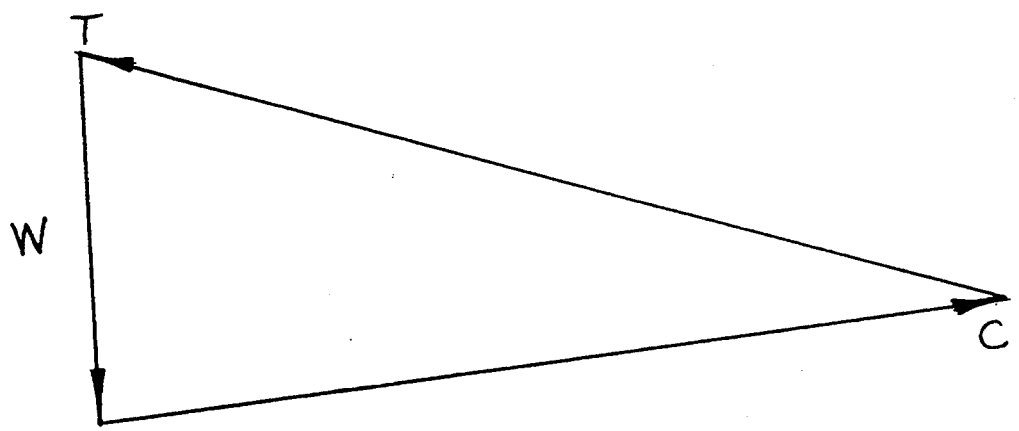
FIG. 7 is a force equilibrium diagram relating to the situation existing in FIG. 6.

By connecting the flexible strap 29 to the top of each concrete block, the arrangement is such that the compressive force which is established between the block and the pipeline would normally exceed the weight of the block. This can be seen with reference to FIG. 6 of the drawings which shows the relevant forces involved. The compressive force existing between each block and the pipeline is identified by reference character C, the tensile force existing in the flexible strap is identified by reference character T and the weight of the block is identified by reference character W. The weight of the block is shown passing through the center of gravity of the block which is identified by reference character Cg. The resulting force equilibrium diagram shown in FIG. 7 reveals that the compressive force does exceed the weight of the block and this ensures that there is good frictional engagement between the mat structure and the pipeline. This frictional engagement may be enhanced by provision of a coating of friction material at appropriate locations on the flexible base.

Figure 8:
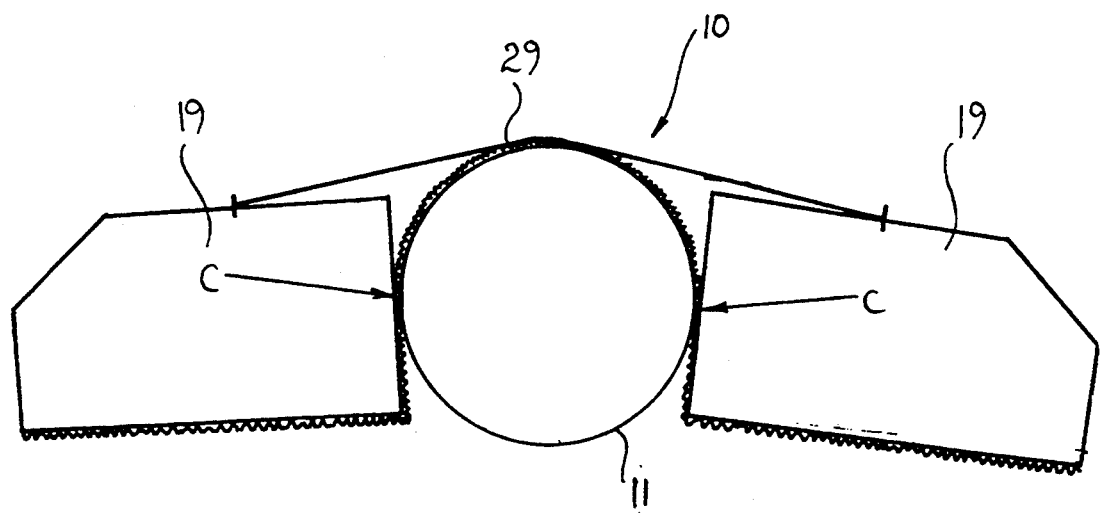
FIG. 8 is a schematic view illustrating one set of frictional forces which are established between the stabilization means and the pipeline.
Figure 9:
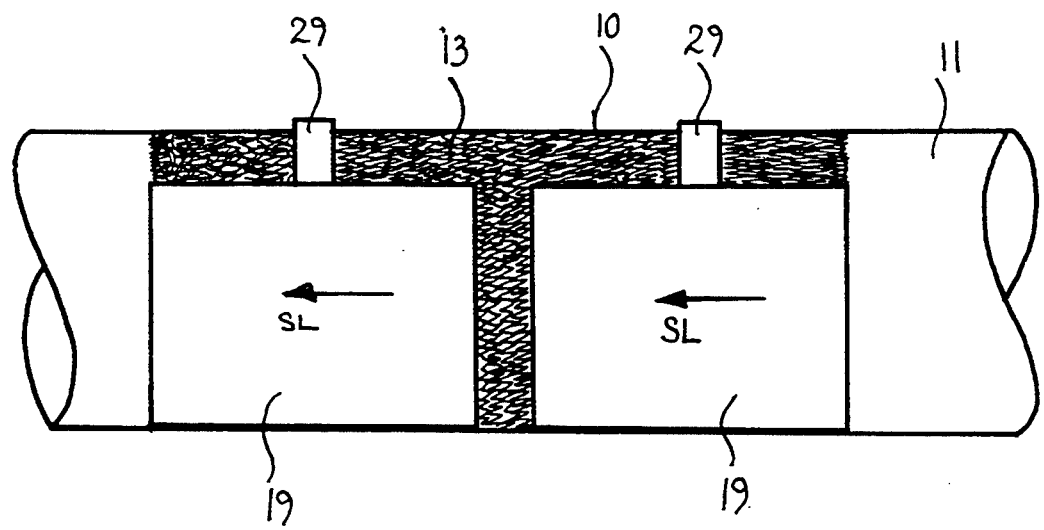
FIG. 9 is a schematic view showing a longitudinal portion of the pipeline and illustrating a further set of frictional forces which are established between the stabilization means and the pipeline.

Frictional engagement between the mat structure and the pipeline serves two purposes, as can be seen from FIG. 8 and 9 of the drawings. Referring to FIG. 8 of the drawings it can be seen that the compressive force C generates a frictional force which resists rotation of the mat structure about the longitudinal axis of the pipeline. Referring to FIG. 9 of the drawings, it can also be seen that the compressive force establishes a further frictional force S1 which acts to resist sliding movement of the blocks along the pipeline when it is inclined in the downward direction. The frictional, forces also cooperate to prevent tilting of the mat structure on the pipeline.

Figure 10:
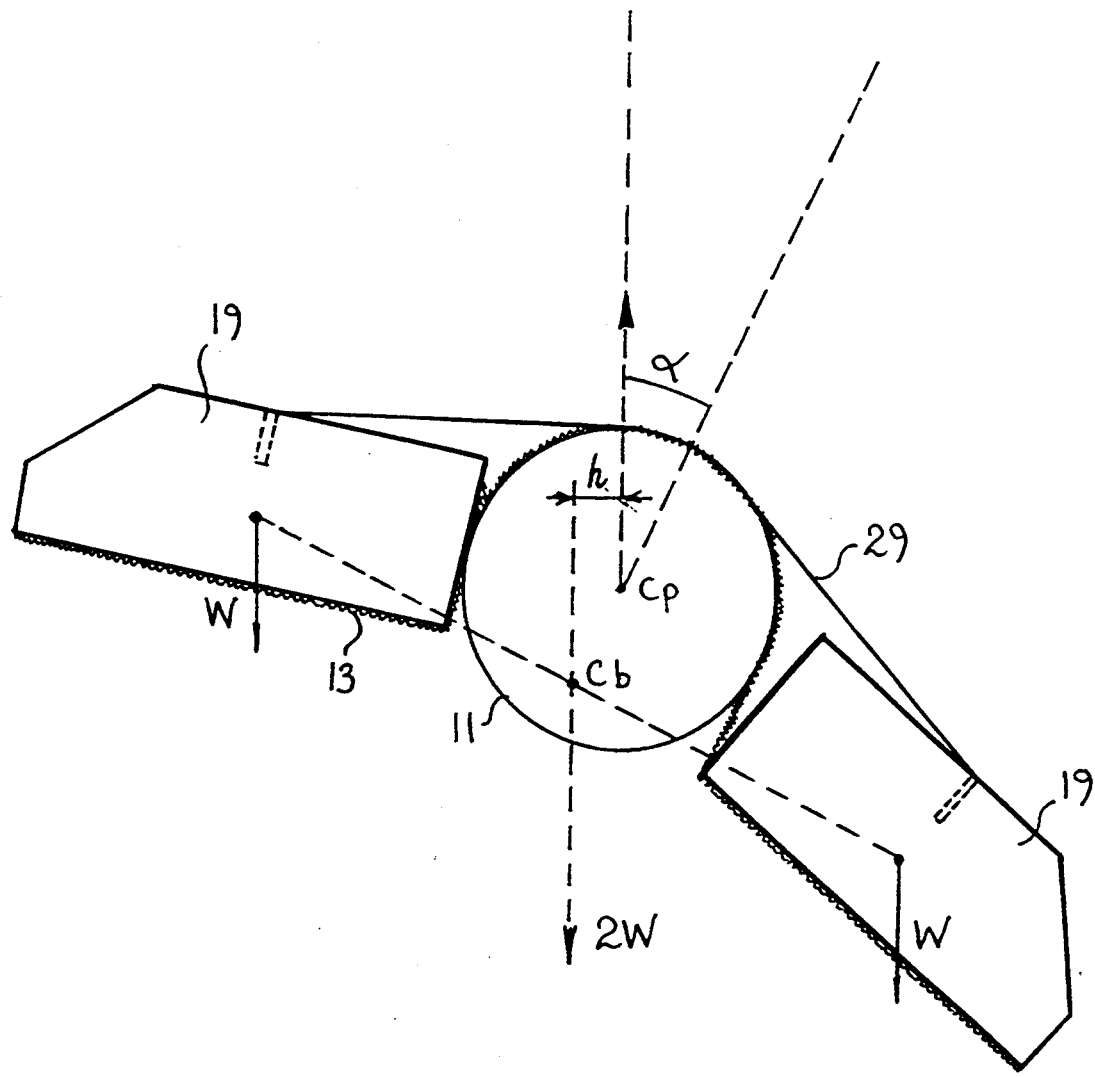
FIG. 10 is a schematic view illustrating the stabilization means when it is occupying an unstable position on the pipeline and showing the resultant forces which act to return the stabilization means to a central position.

The construction of the mat structure provides a self-righting ability should the structure be placed into, or otherwise assume, an unstable position on the pipeline. This feature can be seen from FIG. 10 of the drawings in which the mat structure is shown in an unstable position. When the mat structure is in this unstable position, the moments of forces generated by the weights are unequal and the resultant moment has a tendency to return the mat structure to an equilibrium condition on the pipeline.

Figure 11:
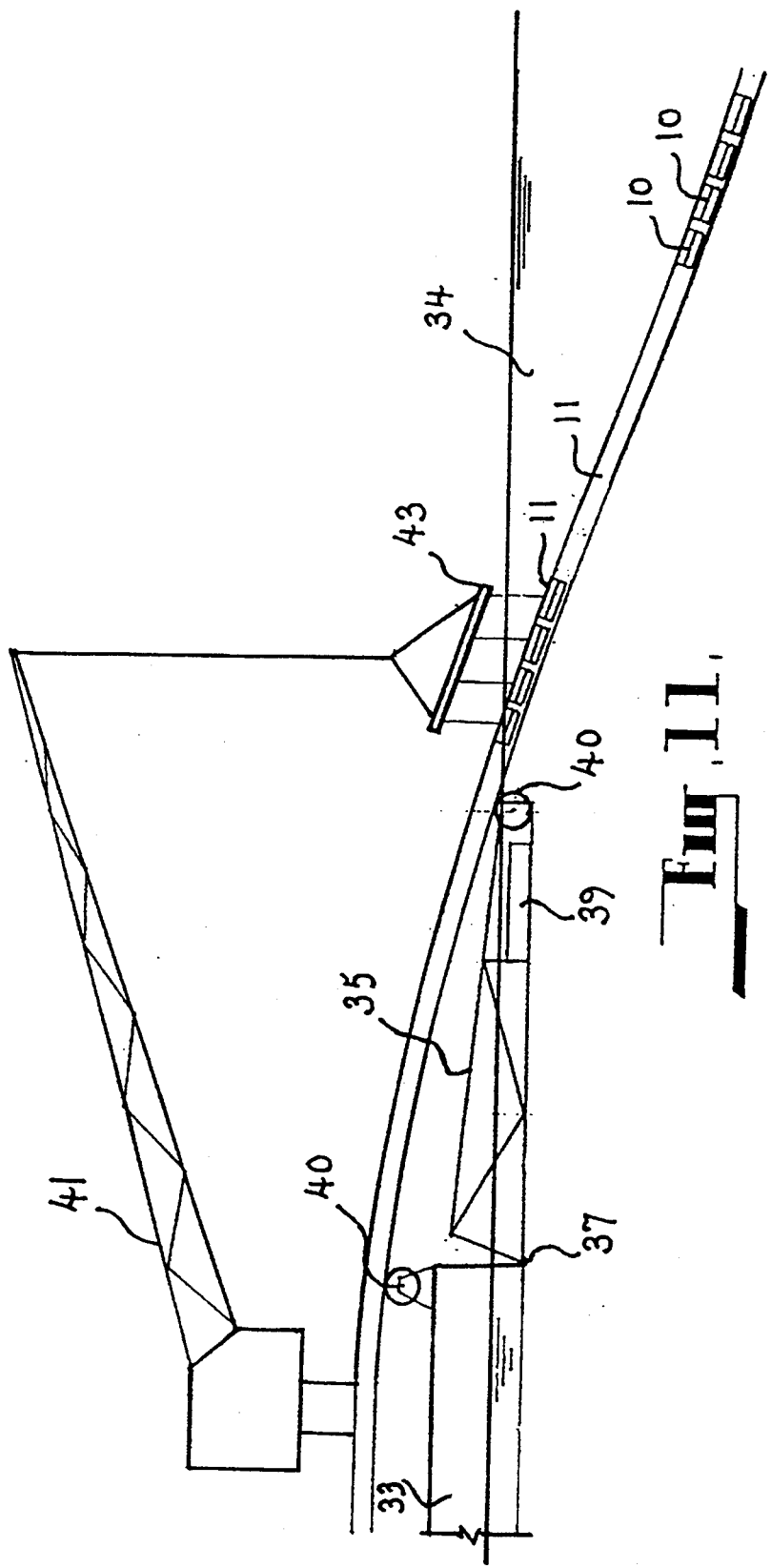
FIG. 11 is a schematic view of a pipeline being laid onto a seabed with several stabilization means according to the embodiment spaced along the length of the pipeline.

In this embodiment, the pipeline 11 is assembled in sections and lowered onto the seabed from a barge 33 which is shown in FIG. 11 of the drawings. The barge floats on the body of water 34 and is provided with a stinger 35 which is hingedly supported on the barge at 37 and which is supported at its free end on a float 39. Roller assemblies 40 are mounted on the deck of the barge and on the stinger 35 to support the pipeline as it advances into the water. The mat structures 10 are stacked on the barge and lifted into position on the pipeline 11 by way of a crane 41 which carries a lifting frame 43. The mat structures are positioned at intervals along the pipeline as it is lowered onto the seabed from the barge, the spacing between successive mats being determined according to the stabilization requirements. Tension is maintained in the pipeline to prevent excessive sagging during the installation process. As each mat structure is positioned on the pipeline, it clampingly engages the pipeline in the manner described previously. This ensures that the mat structure does not slip along the pipeline and also prevents tilting of the mat structure on the pipeline. Furthermore it ensures that the mat structure does not dislodge from the pipeline as the latter moves with wave motion. The mat structures also provide the pipeline with rotational stability as it is lowered to the sea bed owing to the fact that the center of gravity of the mat structure is below the center of the pipeline.

As the mat structure moves into contact with the seabed, it spreads outwardly to assume the position shown in FIG. 1 of the drawings where sections 13b of the base rest on the seabed and section 13a straddles the pipeline.

It should be appreciated that the scope of the invention is not limited to the scope of the embodiment described. For instance, there may be more than one row of concrete blocks on each side of the locating space 23 if desired.

I claim:

1. A stabilizer for providing gravity stabilization of an elongated object having a discrete transverse dimension, said stabilizer comprising a pair of spaced apart weights defining a space therebetween for receiving and retaining said object, each of said weights having a discrete transverse dimension greater than the transverse dimension of said object and defining an upper portion and a lower portion, a lower flexible member interconnecting said weights between said lower portions thereof, said lower flexible member having a length sufficient to rest on and across the top of and along the sides of said object in engagement therewith when said object is positioned between said weights so that said weights exert compressive side forces against said object, and an upper flexible member interconnecting said upper portions of said weights, said upper member having a length sufficient to position said weights with their centers of gravity below the geometric center of said object when said stabilizer weights are positioned on opposite sides thereof.

2. A stabilizer as defined in claim 1 wherein said upper flexible member comprises a strap.

3. A stabilizer as defined in claim 1 wherein said lower flexible member is formed of a substantially nonelastic material.

4. A stabilizer as defined in claim 1 wherein said lower flexible member comprises a sheet material.

5. A stabilizer as defined in claim 1 wherein said upper flexible member is secured to the upper portion of each said weight.

6. A stabilizer as defined in claim 1 wherein said lower flexible member is secured to the lower portion of each said weight.

7. A stabilizer as defined in claim 1 wherein the longitudinal dimension of each of said weights is elongated with respect to the transverse dimension thereof.

8. A stabilizer as defined in claim 1 wherein each said weight defines an inner surface shaped to conform to the profile of the stabilized object.

9. A stabilizer as defined in claim 1 wherein said stabilizer comprises a plurality of pairs of spaced apart weights.

10. A stabilizer as defined in claim 9 wherein said weights are arranged longitudinally along said object, for applying compressive forces against said stabilized object.

11. A stabilizer as defined in claim 1 wherein each said weight defines an outer surface portion configured for reduced resistance to oncoming water flow.

12. A stabilizer as defined in claim 4 wherein the center of gravity of said pair of weights and said sheet material is below the center of gravity of said object when said stabilizer is mounted thereon.

13. A stabilizer as defined in claim 12 wherein said weights and sheet material clampingly engage said object.

14. A stabilizer for providing gravity stabilization of an underwater pipeline having a diameter, said stabilizer comprising a series of pairs of spaced apart weights along the length of said object, each of said pairs of weights defining a space therebetween for receiving and retaining said pipeline, each of said weights having a discrete transverse dimension greater than the diameter of said pipeline and defining an upper portion and a lower portion, a lower flexible member interconnecting said weights between said lower portions thereof, said lower flexible member having a length sufficient to rest on and across the top of and along the sides of said pipeline in engagement therewith when said object is positioned between said weights so that said weights exert compressive side forces against said pipeline, and an upper flexible member interconnecting said upper portions of said weights, said upper member having a length sufficient to position said weights with their centers of gravity below the geometric center of said pipeline when said stabilizer weights are positioned on opposite sides thereof.

15. A stabilizer for providing gravity stabilization of a pipeline having a discrete diameter, said stabilizer comprising a pair of spaced apart weights defining a space therebetween for receiving and retaining said pipeline, each of said weights having a discrete transverse dimension greater than the diameter of said pipeline and defining an upper portion and a lower portion, a lower flexible blanket interconnecting said weights between said lower portions thereof, said blanket having a length sufficient to rest on and across the top of and along the sides of said pipeline in engagement therewith when said object is positioned between said weights so that said weights exert compressive side forces against said object, and an upper flexible strap interconnecting said upper portions of said weights, said strap having a length sufficient to position said weights with their centers of gravity below the geometric center of said pipeline when said stabilizer weights are positioned on opposite sides thereof.

* * * * *